(12) United States Patent
Kim (10) Patent No.: US 9,879,135 B2
(45) Date of Patent: Jan. 30, 2018

(54) CHEMICAL TREATMENT APPARATUS FOR DILUTING AND ACTIVATING POLYMERS AND METHODS THEREOF

(71) Applicant: UGSI Chemical Feed, Inc., Poway, CA (US)

(72) Inventor: Yong H. Kim, Tinley Park, IL (US)

(73) Assignee: UGSI Chemical Feed, Inc., Poway, CA (US)

( * ) Notice: Subject to any disclaimer, the term of this patent is extended or adjusted under 35 U.S.C. 154(b) by 189 days.

(21) Appl. No.: 14/863,839

(22) Filed: Sep. 24, 2015

(65) Prior Publication Data

US 2016/0090480 A1    Mar. 31, 2016

Related U.S. Application Data

(60) Provisional application No. 62/055,839, filed on Sep. 26, 2014.

(51) Int. Cl.
| | | |
|---|---|---|
| *C08L 33/26* | (2006.01) | |
| *B01F 3/08* | (2006.01) | |
| *B01F 3/12* | (2006.01) | |
| *B01F 5/06* | (2006.01) | |
| *B01F 7/00* | (2006.01) | |
| *B01F 7/06* | (2006.01) | |
| *B01F 13/10* | (2006.01) | |
| *C08L 33/02* | (2006.01) | |
| *B01F 15/02* | (2006.01) | |

(52) U.S. Cl.
CPC ............ *C08L 33/26* (2013.01); *B01F 3/0803* (2013.01); *B01F 3/0853* (2013.01); *B01F 3/0861* (2013.01); *B01F 3/1221* (2013.01); *B01F 5/0605* (2013.01); *B01F 5/0615* (2013.01); *B01F 5/0648* (2013.01); *B01F 5/0688* (2013.01); *B01F 7/00341* (2013.01); *B01F 7/06* (2013.01); *B01F 7/063* (2013.01); *B01F 13/103* (2013.01); *B01F 13/1033* (2013.01); *C08L 33/02* (2013.01); *B01F 2003/0896* (2013.01); *B01F 2013/1075* (2013.01); *B01F 2015/0221* (2013.01); *B01F 2215/0049* (2013.01); *C08L 2205/025* (2013.01)

(58) Field of Classification Search
CPC .................................. C08L 33/26; C08L 33/02
USPC .................. 523/322, 313; 525/218; 422/134; 366/241, 290
See application file for complete search history.

(56) References Cited

U.S. PATENT DOCUMENTS

| | | | |
|---|---|---|---|
| 3,852,234 | A | 12/1974 | Venema |
| 4,874,248 | A | 10/1989 | Luetzelschwab |
| 5,135,968 | A | 8/1992 | Brazelton et al. |
| 5,164,429 | A | 11/1992 | Brazelton et al. |
| 6,451,265 | B1 | 9/2002 | Misuraca |
| 2007/0064524 | A1 | 3/2007 | Brazelton |

*Primary Examiner* — Terressa Boykin
(74) *Attorney, Agent, or Firm* — The Webb Law Firm (57) ABSTRACT

A chemical treatment apparatus for diluting and activating a polymeric material can include a mixing chamber having a first end, a second end, a first baffle plate positioned between the first end and second end, a high shear mixing zone positioned between the first end of the mixing chamber and the first baffle plate, and a low shear mixing zone positioned downstream from the high shear agitation zone between the second end of the mixing chamber and the first baffle plate. The volume ratio of the high shear mixing zone to the low shear mixing zone can be in the range of 1:2 to 1:10. A method and system for diluting and activating polymeric materials are also disclosed.

21 Claims, 6 Drawing Sheets

CHEMICAL TREATMENT APPARATUS FOR DILUTING AND ACTIVATING POLYMERS AND METHODS THEREOF

This application claims the benefit of U.S. Provisional Patent Application No. 62/055,839, filed Sep. 26, 2014, the entire contents of which is hereby incorporated by reference.

BACKGROUND OF THE INVENTION

Field of the Invention

The present invention relates to a chemical treatment apparatus for diluting and activating polymeric materials as well as methods of diluting and activating polymeric materials using the chemical treatment apparatus.

Description of Related Art

Polymeric materials such as polyelectrolytes are often used as flocculants and coagulants for treating wastewater. These polymeric materials typically have a long-chain structure with a high-molecular weight and are tightly tangled prior to activation. To untangle and activate these materials for use, such as for treating wastewater, the polymeric materials are diluted and mixed with water. The degree of activation can be determined by measuring the viscosity of the resulting polymeric solutions. Generally, viscosity increases as the polymer is untangled and becomes more activated with a minimum degree of damage to the long-chain structure. The maximum viscosity associated with a fully activated polymer will vary based on the chemical structure of the polymeric material.

Typically, when a high-molecular weight polymeric material contacts water, a sticky layer forms around the outer surface resulting in the formation of aggregates or "fisheyes". These fisheyes make it difficult for water to penetrate and hydrate the tangled polymeric material, thereby increasing the time needed to completely activate the tangled polymeric material. To prevent the formation of fisheyes, high shear agitation is used to mix the polymeric material with water. As water begins to hydrate the polymeric material during this mixing step, the long-chain structure of the polymer starts to untangle. The molecules of the partially-hydrated polymeric material are very fragile and are easily damaged by the energy created by the high shear agitation. Due to the increased fragility of the polymer molecules, low shear agitation is sometimes used in lieu of or in addition to high shear agitation. While low shear agitation is less damaging, this mixing technique increases the period of time it takes to activate the polymeric materials.

Extensive time and efforts have been expended in developing apparatuses and methods for diluting and activating polymeric materials. While these apparatuses and methods have overcome some of the drawbacks associated with the prior art, there is still a need for an improved apparatus and method that can quickly and efficiently dilute and activate polymeric materials.

SUMMARY OF THE INVENTION

The present invention is directed to a chemical treatment apparatus for diluting and activating a polymeric material. The apparatus can include a mixing chamber having a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate. The volume ratio of the high shear mixing zone to the low shear mixing zone can be from 1:2 to 1:10. The chemical treatment apparatus can also include a mechanical mixing device and a static mixer. The mechanical mixing device can be connected to the first end of the mixing chamber and extend into the high shear mixing zone, and the static mixer can be positioned at the second end of the mixing chamber. In some aspects, the low shear mixing zone can be completely free of a mechanical mixing device.

Further, the mechanical mixing device can include a motor and an impeller. The impeller can be positioned within the high shear mixing zone. The motor can be directly connected to the impeller.

As indicated, the chemical treatment apparatus can include a first baffle plate. To allow fluid to flow from the high shear mixing zone and into the low shear mixing zone, the first baffle plate can include a plurality of pathways. In some aspects, the chemical treatment apparatus can include a second baffle plate positioned between the first baffle plate and the second end of the mixing chamber.

In addition, the volume of the mixing chamber can be greater than or equal to a half gallon, and the length of the static mixer can be greater than 5 inches. A post-dilution zone can also be positioned between the second end of the mixing chamber and the static mixer.

The present invention further includes a method of diluting and activating a polymeric material. The method can include: transporting a polymeric material and water into a mixing chamber having a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate; and mixing the polymeric material and water in the high shear mixing zone with a mechanical mixing device. The volume ratio of the high shear mixing zone to the low shear mixing zone can be from 1:2 to 1:10, and the low shear mixing zone can be completely free of a mechanical mixing device.

The method can further include post-diluting the mixed polymeric material and water in a post-dilution zone, and mixing the post-diluted mixture of polymeric material and water in a static mixer. The post-diluted mixture can have a polymeric material concentration of 0.25% to 1%.

Further, the mechanical mixing device can include a motor and an impeller. The impeller can be positioned within the high shear mixing zone. The motor can be directly connected to the impeller.

As indicated, the chemical treatment apparatus can include a first baffle plate. To allow fluid to flow from the high shear mixing zone and into the low shear mixing zone, the first baffle plate can include a plurality of pathways. In some aspects, the chemical treatment apparatus can include a second baffle plate positioned between the first baffle plate and the second end of the mixing chamber.

In addition, the volume of the mixing chamber can be greater than or equal to a half gallon, and the length of the static mixer can be greater than 5 inches. A post-dilution zone can also be positioned between the second end of the mixing chamber and the static mixer.

The present invention further includes a system for diluting and activating a polymeric material. The system can include a chemical treatment apparatus that includes: a mixing chamber having a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate; a mechanical mixing device connected to the first end of the mixing chamber and extending into the high shear mixing zone; and a static mixer positioned at the second end of the mixing chamber. The volume ratio of the high shear mixing zone to the low shear mixing zone can be from 1:2 to 1:10, and the low shear mixing zone is completely free of a mechanical mixing device.

The system also includes a water distribution apparatus in fluid communication with the chemical treatment apparatus as well as a polymer distribution apparatus in fluid communication with the chemical treatment apparatus. In certain aspects, the chemical treatment apparatus, water distribution apparatus, and/or polymer distribution apparatus are operated with a controller.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments and aspects of the invention. Hence, specific dimensions and other physical characteristics related to the embodiments and aspects disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The present invention is directed to a chemical treatment apparatus 10 for diluting and activating polymeric materials. As used herein, "polymeric materials" refers to materials that include a polymer. A "polymer" means homopolymers (e.g., prepared from a single monomer species), copolymers (e.g., prepared from at least two monomer species), and graft polymers. The polymeric materials can have various forms including, but not limited to, polymer beads, powders, water in oil emulsions, concentrated solution gels, and combinations thereof.

Figure 1:
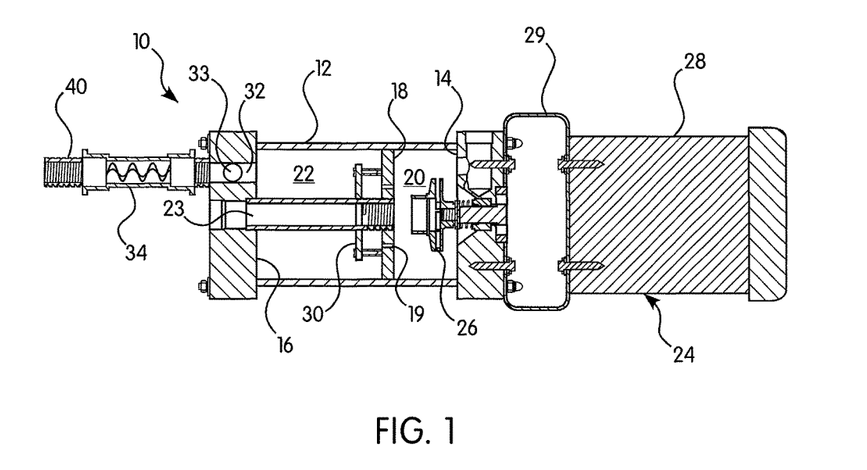
FIG. 1 is a cross-sectional view of a chemical treatment apparatus according to the present invention.

As shown in FIG. 1, the chemical treatment apparatus 10 can include a mixing chamber 12 having a first end 14, a second end 16, and a first baffle plate 18 positioned between the first end 14 and the second end 16. A high shear mixing zone 20 can be positioned between the first end 14 of the mixing chamber 12 and the first baffle plate 18. A low shear mixing zone 22 can be positioned downstream from the high shear mixing zone 20 between the second end 16 of the mixing chamber 12 and the first baffle plate 18. As used herein, "downstream" refers to the direction of the flow of working fluid. As such, the low shear mixing zone 22 "downstream" from the high shear mixing zone 20 means that working fluid will flow from the high shear mixing zone 20 and into the low shear mixing zone 22 during operation of the chemical treatment apparatus 10. As shown in FIG. 1, the first baffle plate 18 can have a plurality of pathways 19 that allows fluid to flow from the high shear mixing zone 20 and into the low shear mixing zone 22 during operation of the chemical treatment apparatus 10. The first baffle plate 18 can have a diameter that is equal to the internal diameter of the mixing chamber 12.

As used herein, "high shear" refers to agitation that produces a shear rate above 4,500 sec.$^{-1}$, and "low shear" refers to agitation that produces a shear rate below 4,500 sec.$^{-1}$. "Shear rate" is the rate at which progressive shearing deformation is applied to a material. Shear rate can be determined using the G value or mean shear rate, which may be characterized for a Newtonian fluid such as water in accordance with equation (I) below:

$$G = \left(\frac{P}{\mu V}\right)^{1/2}. \tag{I}$$

With reference to equation (I), P is the power dissipated by the fluid motion, μ is the fluid dynamic viscosity, and V is the fluid volume in the mixing vessel. The determination of shear rate is also disclosed in U.S. Pat. No. 5,164,429 at column 4, lines 11 to 47, the relevant portions of which are incorporated by reference herein.

Further, the total volume of the mixing chamber 12 can be greater than or equal to a half gallon, such as greater than or equal to one gallon. The volume of the low shear mixing zone 22 can also be larger than the volume of the high shear mixing zone 20. For example, the volume ratio of the high shear mixing zone to the low shear mixing zone is in the range of 1:2 to 1:10. In some aspects, the volume ratio of the high shear mixing zone to the low shear mixing zone is in the range of 1:2 to 1:8, such as from 1:2 to 1:6, such as from 1:2 to 1:4. The volume ratios described herein sufficiently dilute and activate polymeric materials within a reasonable time period without damaging or affecting the properties of the polymers.

Figure 2:
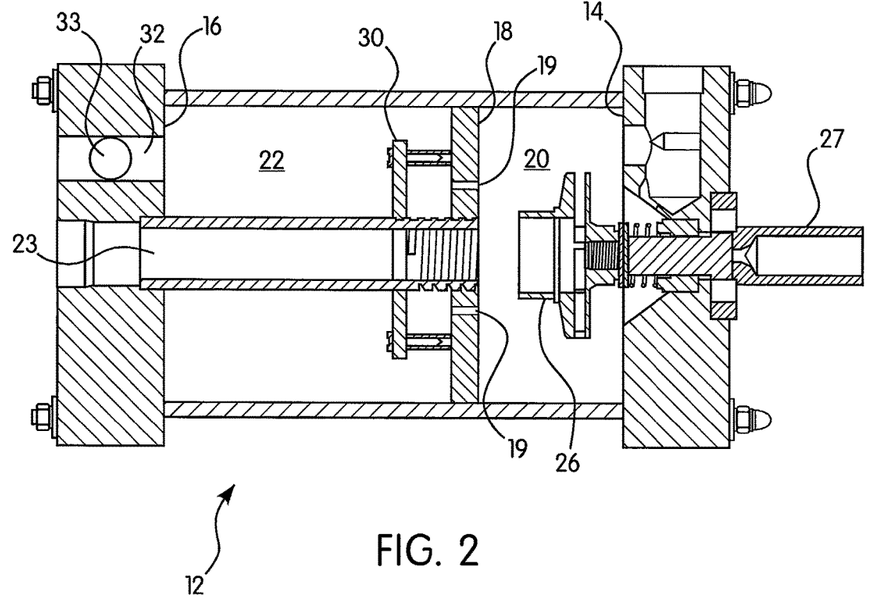
FIG. 2 is a cross-sectional view of a mixing chamber according to the present invention.
Figure 3:
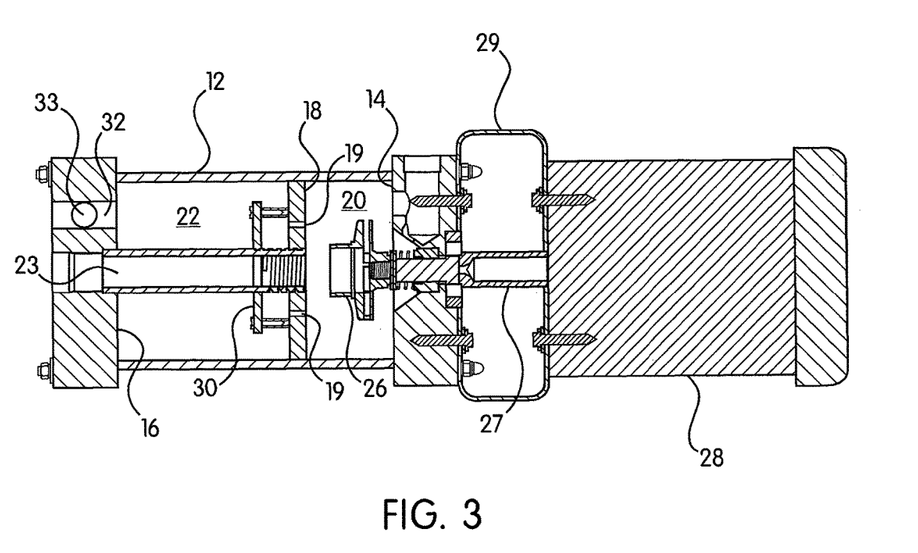
FIG. 3 is a cross-sectional view of the mixing chamber of FIG. 2 attached to a motor.

Referring to FIG. 1, the chemical treatment apparatus 10 can further include a mechanical mixing device 24. The mechanical mixing device 24 can be connected to the first end 14 of the mixing chamber 12 and extend into the high shear mixing zone 20. As used herein, a "mechanical mixing device" refers to a device or apparatus that can blend, disperse, and/or combine various materials using energy provided by movement of mechanical parts or components. For example, the mechanical mixing device 24 can include a motor 28 and mechanical parts or components that move with the use of the motor 28. In some aspects, the mechanical mixing device 24 includes an impeller or mixing rotor 26 and a motor 28. As shown in FIG. 1, the impeller or mixing rotor 26 can be positioned within the high shear mixing zone 20 and connect to the motor 28 at the first end 14 of the mixing chamber 12. The impeller or mixing rotor 26 can be directly connected to the motor 28. As used herein, "directly connected" means that the impeller or mixing rotor 26 is connected to the motor 28 without the use of a coupler or other intermediary connecting device. For example, FIG. 2 depicts a mixing chamber 12 that comprises an impeller 26 positioned within the high shear mixing zone 20. As shown in FIG. 2, a shaft 27 from the impeller 26 can extend out from the first end 14 of the mixing chamber 12. Referring to FIG. 3, a motor 28 can then be directly connected to the shaft 27 of the impeller 26. As further shown in FIG. 3, the motor 28 can be secured to the mixing chamber 12 with a mounting device 29 such as a bracket. By directly connecting the impeller 26 to the motor 28, the size of the chemical treatment apparatus 10 can be decreased and/or the size of other components such as the mixing chamber 12 and static mixer 34 can be increased without increasing the overall size of chemical treatment apparatuses currently being used. This allows for easy replacement of conventional chemical treatment apparatuses for the chemical treatment apparatus 10 of the invention described herein.

As explained above, shear rate can be determined using the G value or mean shear rate. When the fluid motion in the high shear mixing zone 20 is created by an impeller 26, P (power dissipated by the fluid motion) can be calculated using equation (II) below:

$$P = 2\pi NT \quad \text{(II)}.$$

With reference to equation (II), N is the rotational speed of the impeller 26 and T is the measured torque. In such cases, the G value can be calculated in accordance with equation (III), as follows:

$$G = \left(\frac{2\pi NT}{\mu V}\right)^{1/2}. \quad \text{(III)}$$

As seen in equation (III), mean shear rate G may be determined experimentally by measuring actual power transmission to the fluid, that is, by measuring the rotational speed of the impeller 26, the torque of the impeller 26, the viscosity of the fluid, and the fluid volume in the high shear mixing zone 20.

Referring again to FIG. 1, the low shear mixing zone 22 does not contain (i.e., is completely free of) a mechanical mixing device 24. As such, the low shear mixing zone 22 can be completely free of an impeller or mixing rotor 26. This ensures that the polymeric materials are subjected to shear rates below 4,500 sec.$^{-1}$ in the low shear mixing zone 22.

As shown in FIGS. 1-3, the mixing chamber 12 can also include a second baffle plate 30. The second baffle plate 30 can be positioned between the first baffle plate 18 and the second end 16 of the mixing chamber 12. The second baffle plate 30 can have a diameter that is less than the diameter of the first baffle plate 18. Further, the second baffle plate 30 can be used to adjust the flow of fluid within the low shear mixing zone 22. For instance, fluid can flow from the high shear mixing zone 20, through the plurality of pathways 19 in the first baffle plate 18, and into the low shear mixing zone 22 where the fluid will flow into the second baffle plate 30, thereby causing the fluid to be diverted in a different direction to flow around the second baffle plate 30. Thus, as shown in FIGS. 1-3, the pathways 19 can be aligned in the first baffle plate 18 such that fluid is directed into the second baffle plate 30. By adjusting the flow of fluid within the low shear mixing zone 22, the second baffle plate 30 can induce a turbulent flow to cause further mixing of water and the polymeric materials in the low shear mixing zone 22 at a low shear rate.

As shown in FIGS. 1-3, the mixing chamber 12 can include a primary water passageway 23, such as a pipe, that extends from the second end 16 of the mixing chamber 12, through the low shear mixing zone 22, and into the high shear zone 20 such that water is delivered directly into the high shear mixing zone 20. Water entering the high shear mixing zone 20 through the primary water passageway 23 can then be mixed with a polymeric material. The polymeric material can enter the high shear mixing zone 20 from the first end 14 of the mixing chamber 12.

Referring to FIG. 1, the chemical treatment apparatus 10 can include a post-dilution zone 32. The post-dilution zone 32 can be positioned near or adjacent to the second end 16 of the mixing chamber 12 such that the diluted and activated polymeric materials exiting the mixing chamber 12 can be further diluted with water in the post-dilution zone 32. Water for the post-dilution process can be delivered into the chemical treatment apparatus 10 through a post-dilution water entry or port 33 located near or adjacent to the second end 16 of the mixing chamber 12. Post-dilution water can then flow to the post-dilution zone 32 where it mixes with the diluted and activated polymeric materials exiting the mixing chamber 12. In certain aspects, post-dilution water flows into the diluted and activated polymeric materials exiting the mixing chamber 12 at a direction perpendicular to the flow of the diluted and activated polymeric materials.

The post-dilution zone 32 can be used to reduce the polymer concentration. For example, the polymeric materials can be diluted in the mixing chamber 12 to obtain a first concentration, such as a 1% concentration. After exiting the mixing chamber 12, the polymeric materials can be diluted further in the post-dilution zone 32 to a second polymer concentration, such as in the range of 0.25% to 0.5%. As such, the chemical treatment apparatus 10 can be used to obtain activated polymers at concentrations of 0.25% to 1%.

Referring again to FIG. 1, the chemical treatment apparatus 10 can also include a static mixer 34. The static mixer 34 can be connected to the post-dilution zone 32 to mix the post-diluted polymeric materials. As indicated above, by directly connecting the impeller or mixing rotor 26 to the motor 28, the size of the static mixer 34 can be increased as compared to other static mixers 34 used with conventional chemical treatment apparatuses. The length of the static mixer 34 can be greater than 5 inches or greater than 5.5 inches or greater than 6 inches. The extended static mixer 34 can mix the post-diluted polymeric materials to form a homogenous mixture of activated polymers.

After mixing, the diluted and activated polymeric materials can exit the chemical treatment apparatus 10 through a fluid outlet 40. For example, as shown in FIG. 1, the fluid outlet 40 can be connected to the static mixer 34 where the post-diluted and activated polymeric materials can exit the chemical treatment apparatus 10.

As indicated above, the present invention is also directed to a method of diluting and activating polymeric materials. The method includes transporting a polymeric material and water into a mixing chamber 12 of a chemical treatment apparatus 10. The mixing chamber 12 can include, but is not limited to, any of the aspects of the invention described above. For example, as shown in FIG. 1, the method of diluting and activating a polymeric material includes transporting polymeric materials and water into a mixing chamber 12 having a first end 14, a second end 16, a first baffle plate 18 positioned between the first end 14 and the second end 16, a high shear mixing zone 20 positioned between the first end 14 of the mixing chamber 12 and the first baffle plate 18, and a low shear mixing zone 22 positioned downstream from the high shear mixing zone 20 between the second end 16 of the mixing chamber 12 and the first baffle plate 18. The method can include transporting a polymeric material and water to the high shear mixing zone 20 and mixing the polymeric material and water in the high shear mixing zone 20 with a mechanical mixing device 24 as described above. As shown in FIGS. 1-3, water can be delivered directly into the high shear mixing zone 20 such as through the primary water passageway 23.

After mixing the polymeric material with water in the high shear mixing zone 20, the mixture can flow into the low shear mixing zone 22, such as through a plurality of pathways 19 located in the first baffle plate 18. The method can then include mixing the polymeric material and water at a low shear rate in the low shear mixing zone 22. In certain aspects, the low shear mixing zone 22 is completely free of a mechanical mixing device 24 (such as an impeller 26 and/or motor 28). The mixing chamber 12 can also include a second baffle plate 30 positioned between the first baffle plate 18 and the second end 16 of the mixing chamber 12. As previously described, the second baffle plate 30 can be used to adjust the flow of fluid within the low shear mixing zone 22 and induce a turbulent flow to cause further mixing of water and the polymeric material in the low shear mixing zone 22. Thus, the method of diluting and activating polymeric materials can include inducing a turbulent flow within the low shear mixing zone 22 of the mixing chamber 12.

Further, and as described above, the volume of the low shear mixing zone 22 of the mixing chamber 12 can be larger than the volume of the high shear mixing zone 20. For instance, the volume ratio of the high shear mixing zone 20 to the low shear mixing zone 22 can be in the range of 1:2 to 1:10, such as from 1:2 to 1:8, such as from 1:2 to 1:6. As a result, the low shear mixing time can be longer than the high shear mixing time. By using a longer low shear mixing time, the polymeric materials can be diluted and activated within a reasonable time without damaging or effecting the properties of the polymer.

The method can further include post-diluting the diluted/activated polymeric materials in a post-dilution zone 32, and mixing the post-diluted polymeric materials in a static mixer 34. As indicated above, the size of the static mixer 34 can be increased as compared to current conventional apparatuses for diluting and activating polymeric materials. The post-dilution zone 32 and extended static mixer 34 can be used with the present method to further dilute and form a homogenous mixture after mixing the materials in the mixing chamber 12.

Figure 4:
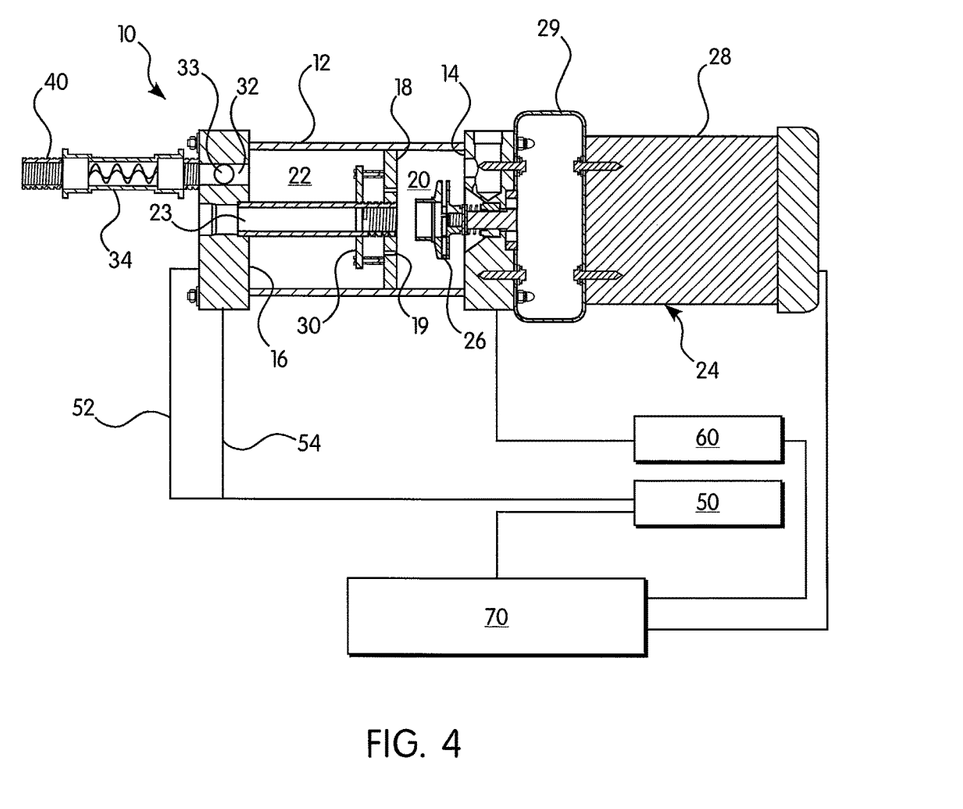
FIG. 4 is a cross-sectional view of a system for diluting and activating polymeric materials according to the present invention.
Figure 5:
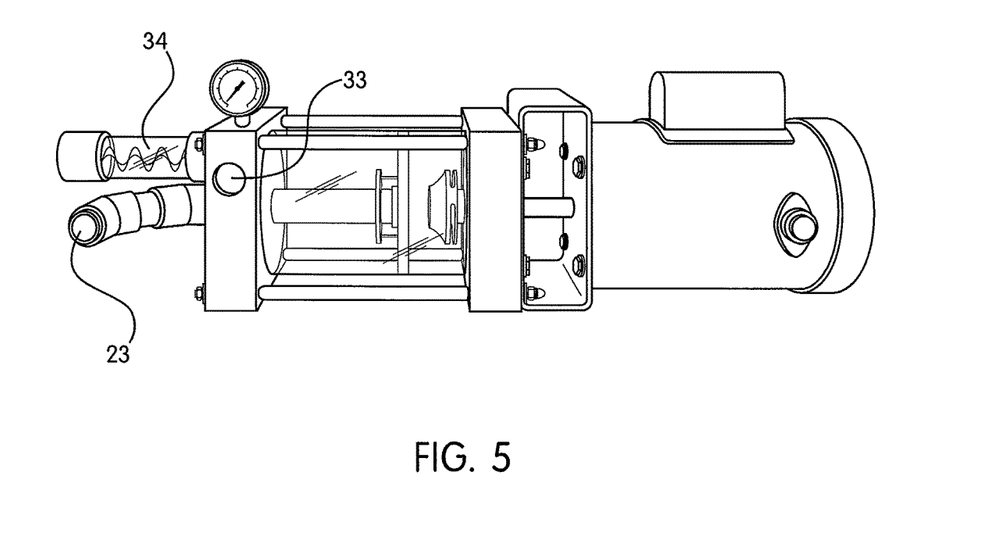
FIG. 5 is a perspective view of a chemical treatment apparatus according to the present invention.
Figure 6:
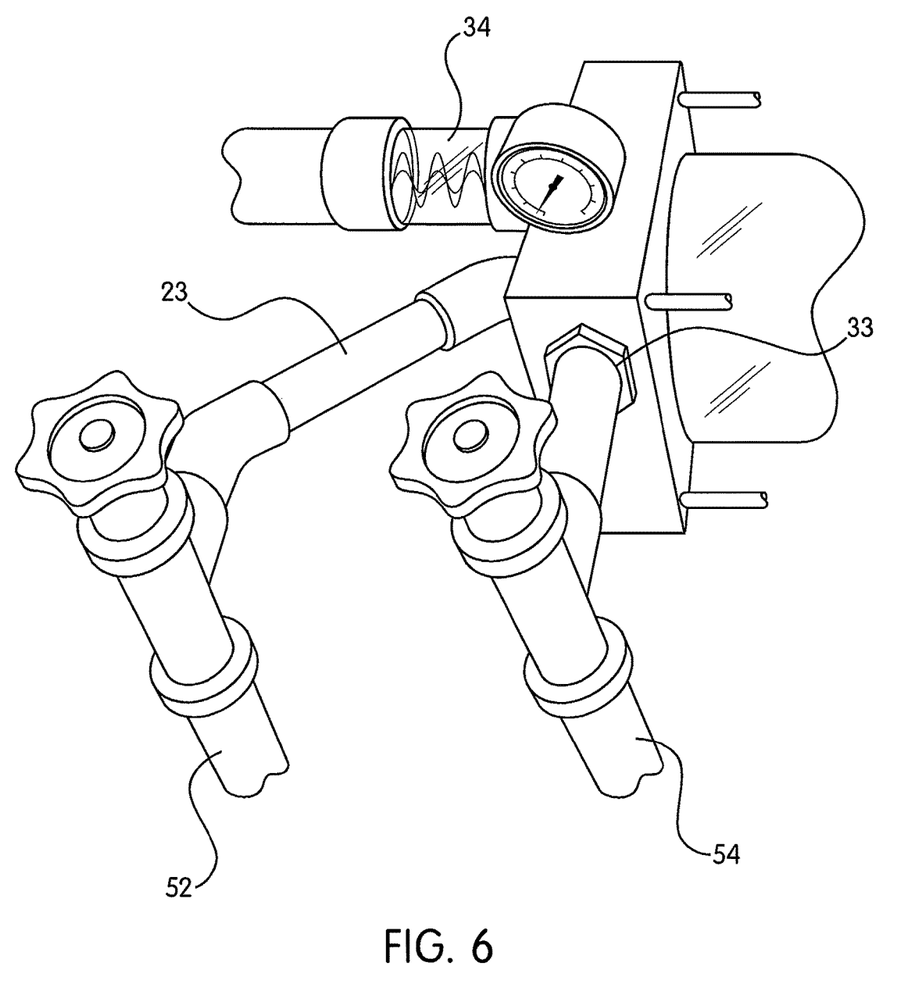
FIG. 6 is a perspective view of a portion of the chemical treatment apparatus of FIG. 5 in fluid communication with a water distribution apparatus.

In addition to the above, the present invention is also directed to a system for diluting and activating polymeric materials. Referring to FIG. 4, the system includes a chemical treatment apparatus 10, a water distribution apparatus 50 in fluid communication with the chemical treatment apparatus 10, and a polymer distribution apparatus 60 in fluid communication with the chemical treatment apparatus 10. The chemical treatment apparatus 10 can include any of the aspects of the invention described in detail above. The water distribution apparatus 50 can include a series of pipes, valves, and pumps that are connected to a water source and which can be controlled to transport water to the chemical treatment apparatus 10. The water distribution apparatus 50 can include a primary water distribution line 52 for providing water to the mixing chamber 12 and a post-dilution water line 54 for providing water to the post-dilution zone 32. As shown in FIG. 4, the primary water distribution line 52 and the post-dilution water line 54 can be connected to the second end 16 of the mixing chamber 12, such as to the primary water passageway 23, and/or the port 33 that leads to the post-dilution zone 32. FIG. 5 further illustrates the post-dilution water entry/port 33 and primary water passageway 23 of a chemical treatment apparatus 10 that is not in fluid communication with a water distribution apparatus 50. FIG. 6 illustrates the post-dilution water entry/port 33 and primary water passageway 23 of a chemical treatment apparatus 10 that is in fluid communication with a water distribution apparatus 50 through the primary water distribution line 52 and the post-dilution water line 54.

Referring to FIG. 4, the polymer distribution apparatus 60 can also include a series of pipes, valves, and pumps that are connected to a polymer storage source and which can be controlled to transport polymers to the chemical treatment apparatus 10. In addition, the polymer distribution apparatus 60 can include a polymer distribution line. As shown in FIG. 4, the polymer distribution line can deliver polymeric materials to the first end 14 of the mixing chamber 12 where they can enter the high shear mixing zone 20.

As further shown in FIG. 4, the chemical treatment apparatus 10, water distribution apparatus 50, and/or polymer distribution apparatus 60 can be operated automatically with a controller 70 such as, for example, a programmable logic controller, a microprocessor, a central processing unit, and/or any other like device capable of processing data, such as a computing device having programmable instructions or software thereon, which, when executed by a processor of the computing device, cause the processor to implement or facilitate the described steps.

The following examples are presented to demonstrate the general principles of the invention. The invention should not be considered as limited to the specific examples presented. All parts and percentages in the examples are by weight unless otherwise indicated.

Example 1

Polymer Dilution and Activation

ZETAG® 7878 (copolymer of acrylamide and a quaternized cationic monomer, commercially available from BASF) and ALCOMER® 120L (copolymer of acrylamide and acrylic acid, commercially available from BASF) were mixed with water in a chemical treatment apparatus that includes a mixing chamber with an inside diameter of about 5.5 inches, a length of about 8.6 inches, and a volume of about 0.9 gallons. The mixing chamber included a first baffle plate, a high shear mixing zone, and a low shear mixing zone. The volume ratio of the high shear mixing zone to the low shear mixing zone was approximately 1:2.2. Further, a second baffle plate was positioned in the low shear mixing zone and a rotating impeller was positioned in the high shear mixing zone. A motor was directly connected to the impeller and mounted to the first end of the mixing chamber with a bracket. The chemical treatment apparatus also included a post-dilution zone and a static mixer with a length of about 6.5 inches.

The chemical treatment apparatus was operated with a microcontroller to prepare polymeric solutions of ZETAG® and ALCOMER® 120L at a concentration of 0.5%. Throughout the process, the polymeric solutions were kept at a temperature of 73° F. to 74° F., the water flow rate into the mixing chamber was 300 gallons per hour (gph)+/−10 gph, and the impeller was run at 3,450 revolutions per minute (rpm). The polymeric solutions were aged for a period of time ranging from 1 minute to 60 minutes.

Example 2

Polymer Dilution and Activation

ZETAG® 7878 (copolymer of acrylamide and a quaternized cationic monomer, commercially available from BASF) and ALCOMER® 120L (copolymer of acrylamide and acrylic acid, commercially available from BASF) were mixed with water in a chemical treatment apparatus that includes a mixing chamber with an inside diameter of about 5.5 inches, a length of about 5.0 inches, and a volume of about 0.5 gallons. The mixing chamber had a first baffle plate, a high shear mixing zone, and a low shear mixing zone. The volume ratio of the high shear mixing zone to the low shear mixing zone was approximately 1:0.8. Further, a second baffle plate was positioned in the low shear mixing zone and a rotating impeller was positioned in the high shear mixing zone. A motor was indirectly connected to the impeller with the use of a coupler. The chemical treatment apparatus also included a post-dilution zone and a static mixer with a length of about 4.8 inches.

The chemical treatment apparatus was operated with a microcontroller to prepare polymeric solutions of ZETAG® 7878 and ALCOMER® 120L at a concentration of 0.5%. Throughout the process, the polymeric solutions were kept at a temperature of 73° F. to 74° F., the water flow rate into the mixing chamber was 300 gallons per hour (gph)+/−10 gph, and the impeller was run at 3,450 revolutions per minute (rpm). The polymeric solutions were aged for a period of time ranging from 1 minute to 60 minutes.

Example 3

Viscosity Evaluation

The viscosities of the polymeric solutions prepared in Examples 1 and 2 were determined using a Brookfield LV spindle 2, 6 rpm (max range 5,000 centipoise (cp)) viscometer. The viscosities of the Zetag® 7878 and Alcomer® 120L polymeric solutions are shown in Tables 1 and 2, respectively.

TABLE 1

Viscosity Data for ZETAG ® 7878 Polymeric Solutions

| Aging Time (min.)[1] | Viscosity (cp) of Example 1 Solutions [2] | Viscosity (cp) of Example 2 Solutions [3] | Percent Viscosity Change (%) [4] |
|---|---|---|---|
| 1 | 395 | 372 | 6.2 |
| 15 | 1140 | 1080 | 5.6 |
| 30 | 1340 | 1220 | 9.8 |
| 60 | 1525 | 1330 | 14.7 |

[1] Aging time of ZETAG ® 7878 solutions after mixing.
[2] Viscosity of ZETAG ® 7878 polymeric solutions prepared using the apparatus of Example 1.
[3] Viscosity of ZETAG ® 7878 polymeric solutions prepared using the apparatus of Example 2.
[4] Percent change in viscosity between the polymeric solutions prepared using the apparatus of Example 1 and the polymeric solutions prepared using the apparatus of Example 2.

TABLE 2

Viscosity Data for ALCOMER ® 120L Polymer Solutions

| Aging Time (min.)[1] | Viscosity (cp) of Example 1 Solutions [2] | Viscosity (cp) of Example 2 Solutions [3] | Percent Viscosity Change (%) [4] |
|---|---|---|---|
| 1 | 1905 | 1795 | 6.1 |
| 15 | 2310 | 2185 | 5.7 |
| 30 | 2505 | 2385 | 5.0 |
| 60 | 2615 | 2520 | 3.8 |

[1] Aging time of ALCOMER ® 120L solutions after mixing.
[2] Viscosity of ALCOMER ® 120L polymeric solutions prepared using the apparatus of Example 1.
[3] Viscosity of ALCOMER ® 120L polymeric solutions prepared using the apparatus of Example 2.
[4] Percent change in viscosity between the polymeric solutions prepared using the apparatus of Example 1 and the polymeric solutions prepared using the apparatus of Example 2.

As shown in Tables 1 and 2, polymeric solutions prepared using the apparatus of Example 1 had higher viscosities than the polymeric solutions prepared using the apparatus of Example 2. Particularly, polymeric solutions prepared using the apparatus of Example 1 had an average viscosity increase of between 5% and 10% when compared to the polymeric solutions prepared using the apparatus of Example 2. Thus, the viscosity data shown in Tables 1 and 2 demonstrate that an extended mixing chamber having a larger low shear mixing zone, according to some aspects of the present invention, can be used to produce a more fully activated polymer.

The present invention is also directed to the following clauses.

Clause 1: A chemical treatment apparatus for diluting and activating a polymeric material comprising: a mixing chamber comprising: a first end, a second end, a first baffle plate positioned between the first end and second end, a high shear mixing zone positioned between the first end of the mixing chamber and the first baffle plate, and a low shear mixing zone positioned downstream from the high shear agitation zone between the second end of the mixing chamber and the first baffle plate; a mechanical mixing device connected to the first end of the mixing chamber and extending into the high shear mixing zone; and a static mixer positioned at the second end of the mixing chamber, wherein a volume ratio of the high shear mixing zone to the low shear mixing zone is in the range of 1:2 to 1:10 and wherein the low shear mixing zone is completely free of a mechanical mixing device.

Clause 2: The chemical treatment apparatus of clause 1, wherein the mechanical mixing device comprises a motor and an impeller.

Clause 3: The chemical treatment apparatus of clause 2, wherein the impeller is positioned within the high shear mixing zone.

Clause 4: The chemical treatment apparatus of any of clauses 2 to 3, wherein the motor is directly connected to the impeller.

Clause 5: The chemical treatment apparatus of any of clauses 1 to 4, wherein the first baffle plate comprises a plurality of pathways.

Clause 6: The chemical treatment apparatus of any of clauses 1 to 5, wherein the mixing chamber further comprises a second baffle plate positioned between the first baffle plate and the second end of the mixing chamber.

Clause 7: The chemical treatment apparatus of any of clauses 1 to 6, further comprising a post-dilution zone positioned between the second end of the mixing chamber and the static mixer.

Clause 8: The chemical treatment apparatus of any of clauses 1 to 7, wherein the length of the static mixer is greater than 5 inches.

Clause 9: The chemical treatment apparatus of any of clauses 1 to 8, wherein the mixing chamber has a volume of greater than or equal to a half gallon.

Clause 10: A method of diluting and activating a polymeric material, the method comprising: transporting a polymeric material and water into a mixing chamber comprising a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate; and mixing the polymeric material and water in the high shear mixing zone with a mechanical mixing device, wherein a volume ratio of the high shear mixing zone to the low shear mixing zone is in the range of 1:2 to 1:10 and wherein the low shear mixing zone is completely free of a mechanical mixing device.

Clause 11: The method according to clause 10, further comprising post-diluting the mixed polymeric material and water in a post-dilution zone, and mixing the post-diluted mixture of polymeric material and water in a static mixer.

Clause 12: The method according to clause 11, wherein the post-diluted mixture has a polymeric material concentration of 0.25% to 1%.

Clause 13: The method according to any of clauses 10 to 11, wherein the mechanical mixing device comprises an impeller and a motor.

Clause 14: The method according to clause 13, wherein the impeller is positioned within the high shear mixing zone.

Clause 15: The method according to any of clauses 13 to 14, wherein the motor is directly connected to the impeller.

Clause 16: The method according to clause 11, wherein the length of the static mixer is greater than 5 inches.

Clause 17: The method according to any of clauses 10 to 16, wherein the mixing chamber has a volume of greater than or equal to a half gallon.

Clause 18: The method according to any of clauses 10 to 17, wherein the first baffle plate comprises a plurality of pathways.

Clause 19: The method according to any of clauses 10 to 18, wherein the mixing chamber further comprises a second baffle plate positioned between the first baffle plate and the second end of the mixing chamber.

Clause 20: A system for diluting and activating a polymeric material comprising: (a) a chemical treatment apparatus for diluting and activating a polymeric material comprising: (i) a mixing chamber comprising a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate, wherein a volume ratio of the high shear mixing zone to the low shear mixing zone is in the range of 1:2 to 1:10; (ii) a mechanical mixing device connected to the first end of the mixing chamber and extending into the high shear mixing zone; and (iii) a static mixer positioned at the second end of the mixing chamber, wherein the low shear mixing zone is completely free of a mechanical mixing device; (b) a water distribution apparatus in fluid communication with the chemical treatment apparatus; and (c) a polymer distribution apparatus in fluid communication with the chemical treatment apparatus.

Clause 21: The system according to clause 20, wherein the chemical treatment apparatus, water distribution apparatus, and/or polymer distribution apparatus are operated with a controller.

Whereas particular embodiments and aspects of this invention have been described above for purposes of illustration, it will be evident to those skilled in the art that numerous variations of the details of the present invention may be made without departing from the invention as defined in the appended claims.

The invention claimed is:

1. A chemical treatment apparatus for diluting and activating a polymeric material comprising:
    a mixing chamber comprising a first end, a second end, a first baffle plate positioned between the first end and second end, a high shear mixing zone positioned between the first end of the mixing chamber and the first baffle plate, and a low shear mixing zone positioned downstream from the high shear agitation zone between the second end of the mixing chamber and the first baffle plate;
    a mechanical mixing device connected to the first end of the mixing chamber and extending into the high shear mixing zone; and
    a static mixer positioned at the second end of the mixing chamber,
    wherein a volume ratio of the high shear mixing zone to the low shear mixing zone is in the range of 1:2 to 1:10, and wherein the low shear mixing zone is completely free of a mechanical mixing device.

2. The chemical treatment apparatus of claim 1, wherein the mechanical mixing device comprises a motor and an impeller.

3. The chemical treatment apparatus of claim 2, wherein the impeller is positioned within the high shear mixing zone.

4. The chemical treatment apparatus of claim 2, wherein the motor is directly connected to the impeller.

5. The chemical treatment apparatus of claim 1, wherein the first baffle plate comprises a plurality of pathways.

6. The chemical treatment apparatus of claim 1, wherein the mixing chamber further comprises a second baffle plate positioned between the first baffle plate and the second end of the mixing chamber.

7. The chemical treatment apparatus of claim 1, further comprising a post-dilution zone positioned between the second end of the mixing chamber and the static mixer.

8. The chemical treatment apparatus of claim 1, wherein the length of the static mixer is greater than 5 inches.

9. The chemical treatment apparatus of claim 1, wherein the mixing chamber has a volume of greater than or equal to a half gallon.

10. A method of diluting and activating a polymeric material, the method comprising:
  a) transporting a polymeric material and water into a mixing chamber comprising a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate; and
  b) mixing the polymeric material and water in the high shear mixing zone with a mechanical mixing device, wherein a volume ratio of the high shear mixing zone to the low shear mixing zone is in the range of 1:2 to 1:10 and wherein the low shear mixing zone is completely free of a mechanical mixing device.

11. The method according to claim 10, further comprising post-diluting the mixed polymeric material and water in a post-dilution zone, and mixing the post-diluted mixture of polymeric material and water in a static mixer.

12. The method according to claim 11, wherein the post-diluted mixture has a polymeric material concentration of 0.25% to 1%.

13. The method according to claim 10, wherein the mechanical mixing device comprises an impeller and a motor.

14. The method according to claim 13, wherein the impeller is positioned within the high shear mixing zone.

15. The method according to claim 13, wherein the motor is directly connected to the impeller.

16. The method according to claim 11, wherein the length of the static mixer is greater than 5 inches.

17. The method according to claim 10, wherein the mixing chamber has a volume of greater than or equal to a half gallon.

18. The method according to claim 10, wherein the first baffle plate comprises a plurality of pathways.

19. The method according to claim 10, wherein the mixing chamber further comprises a second baffle plate positioned between the first baffle plate and the second end of the mixing chamber.

20. A system for diluting and activating a polymeric material comprising:
  a) a chemical treatment apparatus for diluting and activating a polymeric material comprising:
    i) a mixing chamber comprising a first end, a second end, a first baffle plate positioned between the first end and second end, a high shear mixing zone positioned between the first end of the mixing chamber and the first baffle plate, and a low shear mixing zone positioned downstream from the high shear mixing zone between the second end of the mixing chamber and the first baffle plate, wherein a volume ratio of the high shear mixing zone to the low shear mixing zone is in the range of 1:2 to 1:10;
    ii) a mechanical mixing device connected to the first end of the mixing chamber and extending into the high shear mixing zone; and
    iii) a static mixer positioned at the second end of the mixing chamber, wherein the low shear mixing zone is completely free of a mechanical mixing device;
  b) a water distribution apparatus in fluid communication with the chemical treatment apparatus; and
  c) a polymer distribution apparatus in fluid communication with the chemical treatment apparatus.

21. The system according to claim 20, wherein the chemical treatment apparatus, water distribution apparatus, and/or polymer distribution apparatus are operated with a controller.

* * * * *